Dec. 13, 1966 H. VANESS 3,291,335
CONTAINER CLOSURE
Filed March 19, 1965 2 Sheets-Sheet 1
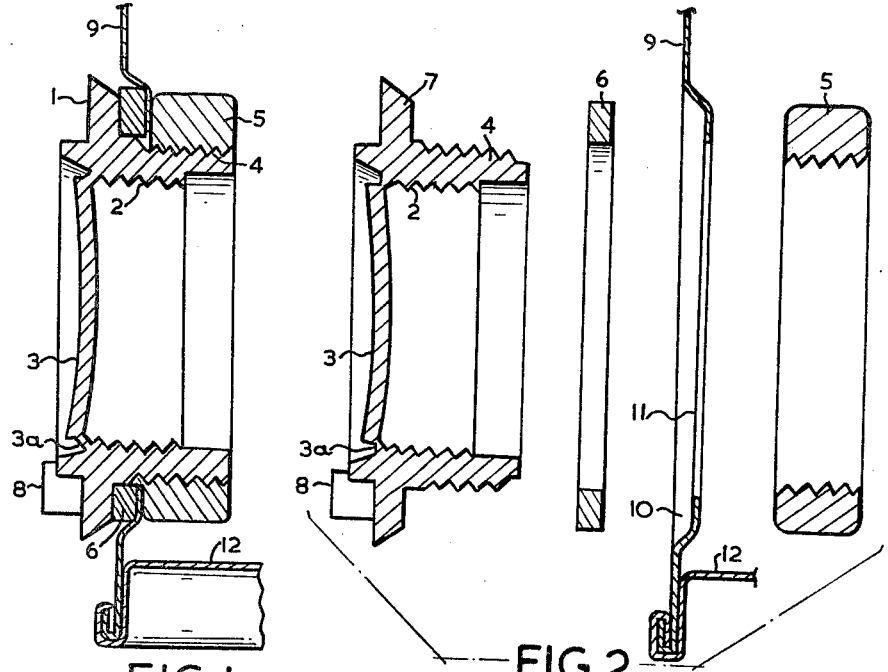
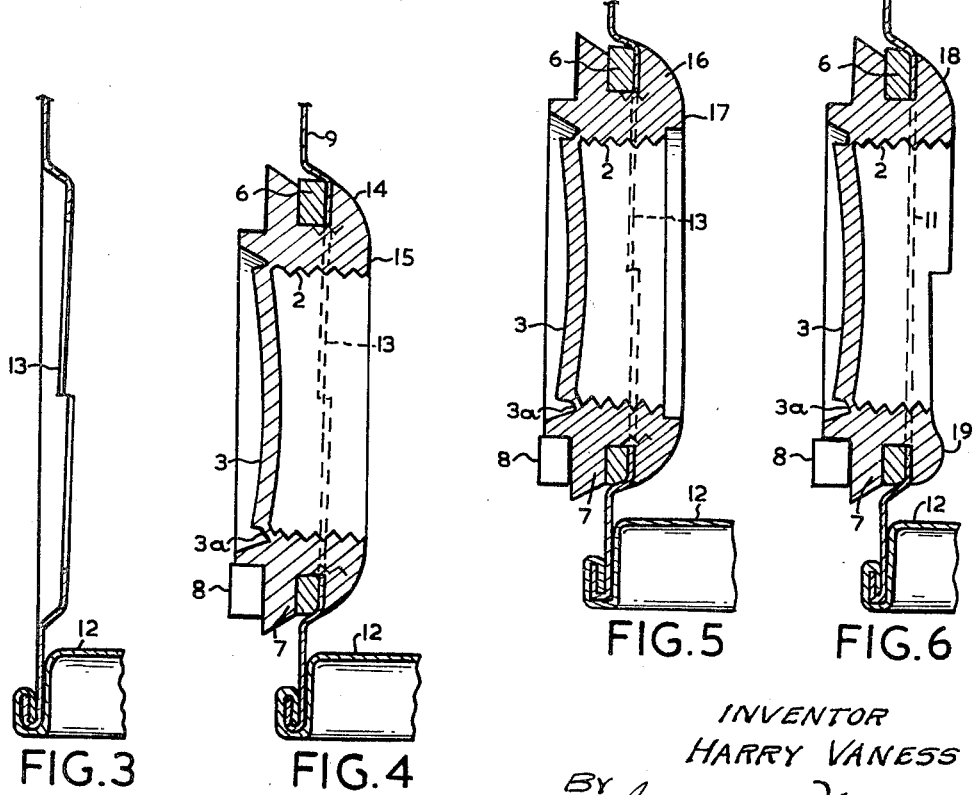
INVENTOR
HARRY VANESS
BY Gardner & Zimmerman
ATTORNEYS Dec. 13, 1966  H. VANESS  3,291,335
CONTAINER CLOSURE Filed March 19, 1965  2 Sheets-Sheet 2

INVENTOR
HARRY VANESS
BY Gardner + Zimmerman
ATTORNEYS

United States Patent Office 3,291,335
Patented Dec. 13, 1966

3,291,335
CONTAINER CLOSURE
Harry Vaness, Homebush, New South Wales, Australia, assignor to Rheem Australia Pty. Limited, Royalmere, New South Wales, Australia, a corporation of Victoria, Australia
Filed Mar. 19, 1965, Ser. No. 441,161
10 Claims. (Cl. 220—27)

This invention relates to a closure preferably, but not necessarily, for a container used for tap dispensing of its contents.

It is therefore an object of the present invention to provide a container closure of a substantially leak proof nature and, by the use of non-metallic materials, to ensure freedom from contamination of the container contents.

It is a further object of the invention to provide a container closure having a tamper proof seal.

It is a further object of the invention to provide a container closure which during insertion will not damage any adjacent lining and so will prevent contamination of the contents of the container.

It is a further object of the invention to provide a container closure which can be made on a production basis with cheap and inexpensive tooling.

It is a further object of the invention to provide a container closure which only requires a simple pierced hole in the wall of the metal container and which has no troublesome extrusions which tend to split.

It is a further object of the invention to provide a container closure which can be made from inexpensive mass produced materials.

It is a further object of the invention to provide a container closure wherein, by correct positioning, the bushing is effectively prevented from rotating during screwing-in of a dispensing tap.

It is a further object of the invention to provide a container closure wherein the dispensing opening is in close proximity to the container bottom for best drainage.

In a general form the invention is a hollow bushing of non-metallic material, screwthreaded internally at least near its outer end, having an external flange near its outer end and adapted to be disposed in a container wall opening and to be secured to the container wall around the opening.

In another form the invention is such a bushing in combination with a container having a simple wall opening, the bushing being located in the opening and secured to the wall around the opening.

Preferably a flexible gasket is located between the flange and the outside of the container wall around the opening and the bushing is secured in the opening by a nut of similar material to that of the bushing screwed onto the outside of the inner end of the bushing and engaging the inside of the container wall around the opening.

The non-metallic material is preferably a thermoplastic synthetic plastic. Such plastics are resistant to the corrosive action of most liquids.

Some forms of the invention will now be described with reference to the accompanying drawings in which:

FIGURE 1 is a sectional view of the preferred form of closure according to the invention fitted to a container wall;

FIGURE 2 is an exploded view illustrating the bushing, sealing gasket, preformed container opening and locking nut in accordance with FIGURE 1;

FIGURE 3 illustrates a variation of the pierced opening of FIGURES 1 and 2 wherein the opening is formed as a single line screw thread;

FIGURE 4 illustrates a closure wherein locking or securing to the container is achieved by heat sealing as well as screwing-in;

FIGURE 5 illustrates an alternative to FIGURE 4 wherein the locking is achieved by spinning in addition to screwing-in; and FIGURE 6 illustrates an alternative to FIGURE 1 in which the locking is achieved by spinning or heat sealing.

Figure 7:
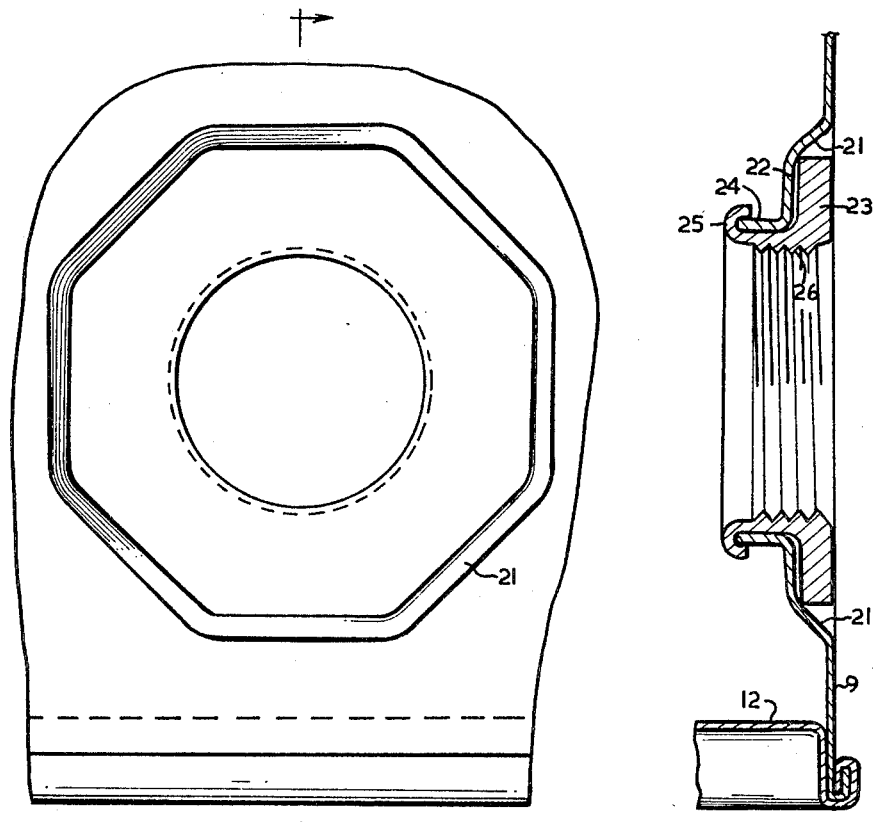
Figure 8:
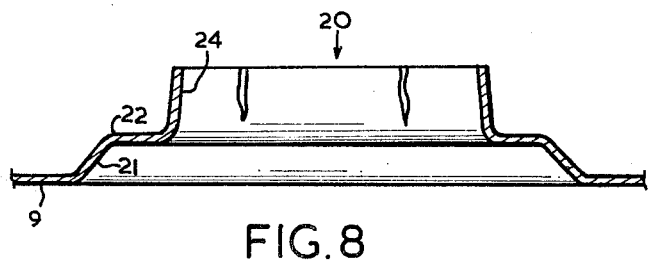

The previous practice is illustrated in FIGURES 7 and 8 of the accompanying drawings in which:

FIGURE 7 shows in side elevation and in section the bushing of the prior art secured in an opening in a container wall near the container floor and FIGURE 8 shows the formation around the container wall opening of FIGURE 7 before the bushing is secured in the opening.

In FIGURES 7 and 8 the container wall is 9 and the container bottom or floor is 12.

The wall around an opening 20 is recessed at 21, 22 to receive the base 23 of the bushing. The portion 21 is made polygonal to receive a correspondingly formed outer edge of the base 23. This limits rotation of the bushing in the recess. The wall around the opening is extruded to form a wall neck 24 which receives the bushing neck 25. The bushing is then secured in position by curling the inner end of the neck 25 about the inner end of the neck 24.

The bushing is screwthreaded at 26 to receive a sealing plug or dispensing cap.

This type of closure has been found to be comparatively expensive to produce and has also presented production and assembly problems which leave much to be desired.

One of the most troublesome defects occurs in the formation of the opening to receive the bushing. A major problem occurs through the high incidence of splits in the extruded necks 24, as shown in FIGURE 8, especially in the case of light gauge metals. These splits could be so extensive as to cause complete spoilage or could frequently render the closure highly susceptible to leakage of the container contents.

In order to complete a prior art closure assembly as described it is necessary to perform two operations:
(1) Form the opening in the container wall;
(2) Assemble the bushing to the opening.

This requires in each case expensive press tooling which must be rigidly serviced and maintained. These considerations of necessity add considerably to the cost of the finished product.

In many instances such containers are made with a specific inner lining coating to protect the contents against contamination and, in the case of a closure using a steel bushing, this objective is not achieved due to the splitting aforementioned, and the insertion of the bushing seriously damages the lining.

As generally shown in FIGURE 1, the preferred closure consists of a bushing 1 made from a non-metallic material having an internal screwthread 2 to receive a sealing plug or dispensing tap (not shown) after a tamper proof membrane 3 has been removed by cutting along a peripheral line 3a. An external screwthread 4 is provided to receive a locking nut 5, the locking nut also being of non-metallic material. The nut may be provided with a series of external flats for the purpose of accepting a spanner or the like to adequately lock the closure. A sealing gasket 6 of rubber or like material is fitted between the container wall and the inside of the flange 7 of the bushing. Extending from the base of the flange 7 is a series of lugs 8 to act as retaining means during the locking operation.

As shown in FIGURE 2, the opening in the container wall 9 includes a slightly raised annular recess 10 and a plain pierced hole 11 formed by a comparatively inexpensive and simple press tool. This does not present any problems such as would cause spoilage or rejects.

The actual closing operation does not involve any press tooling and can be carried out by conventional means such as a pneumatic spanner or other suitable means.

To protect the container contents against pilfering, the bushing 1 includes as a tamper proof seal the membrane 3 integral with the internal wall of the bushing but so constructed that it is easily removed, when it is required to fit a dispensing tap or sealing plug, by cutting along the reduced wall thickness as shown at 3a. The bushing, if so desired, may be made without the sealing membrane 3.

To permit maximum drainage, the dispensing opening is located in the container wall 9 in close proximity to the container bottom 12 to allow a comparatively minor quantity of the contents to remain after the main contents have been dispensed.

As an alternative to the foregoing, the pierced opening may be formed in such a manner as to present a single line screw thread 13 as shown in FIGURE 3, in which case the locking nut 5 (FIGURE 1) can be dispensed with and the bushing 1 secured in place by engaging it with the thread 13.

As a further alternative, the locking or securing may be by heat sealing the inner end 14 of the wall or neck of the bushing 15 to the container wall 9, about the pierced opening 13 as shown in FIGURE 4, the opening being formed with a single screwthread as in FIGURE 3.

As a further alternative the locking may be achieved by spinning the inner end 16 of the wall of the bushing 17 about the opening 13 as shown in FIGURE 5, the opening being as shown in FIGURE 3.

As a further alternative the locking may be by heat sealing as at 18, or spinning as at 19, the wall of the bushing about the opening as shown in FIGURE 6, the opening being as shown in FIGURE 2.

What I claim is:

1. A container having a threaded opening formed through its wall, and a hollow bushing of non-metallic material, screwthreaded internally at least near its outer end and screwthreaded externally at least near its inner end and having an external flange near its outer end, the bushing being screwed into and secured in the container opening with the flange outside the container and against the container wall.

2. The combination of claim 1 wherein a sealing gasket is clamped between the flange and the container wall.

3. A container having an opening formed through its wall, and a hollow bushing of non-metallic material screw-threaded internally at least near its outer end and having an external flange near such outer end, the bushing being secured in the container opening with the flange outside the container and against the container wall by its inner end being heat sealed against the inside of the container-wall around the opening.

4. The combination of claim 3 wherein a sealing gasket is clamped between the flange and the container wall portion.

5. The combination of claim 3 wherein the container opening is threaded, and the bushing is threaded externally and screwed into such opening.

6. The combination of claim 5 wherein a sealing gasket is clamped between the flange and the container wall portion.

7. A container having an opening formed through its wall, and a hollow bushing of non-metallic material screw-threaded internally at least near its outer end and having an external flange near such outer end, the bushing being secured in the container opening with the flange outside the container and against the container wall by its inner end being spun against the inside of the container wall around the opening.

8. The combination of claim 7 wherein a sealing gasket is clamped between the flange and the container wall portion.

9. The combination of claim 7 wherein said container opening is threaded and said bushing is threaded externally and screwed into such opening.

10. The combination of claim 9 wherein a sealing gasket is clamped between the flange and the container wall.

References Cited by the Examiner

UNITED STATES PATENTS

| | | | |
|---|---|---|---|
| 2,117,111 | 5/1938 | Bills | 285—206 |
| 2,772,017 | 11/1956 | Rieke | 220—27 |

THERON E. CONDON, *Primary Examiner.*

JAMES B. MARBERT, *Examiner.*